April 14, 1936.  C. H. VOGT  2,037,355
METHOD OF MAKING A FOOD PRODUCT
Filed Feb. 23, 1932
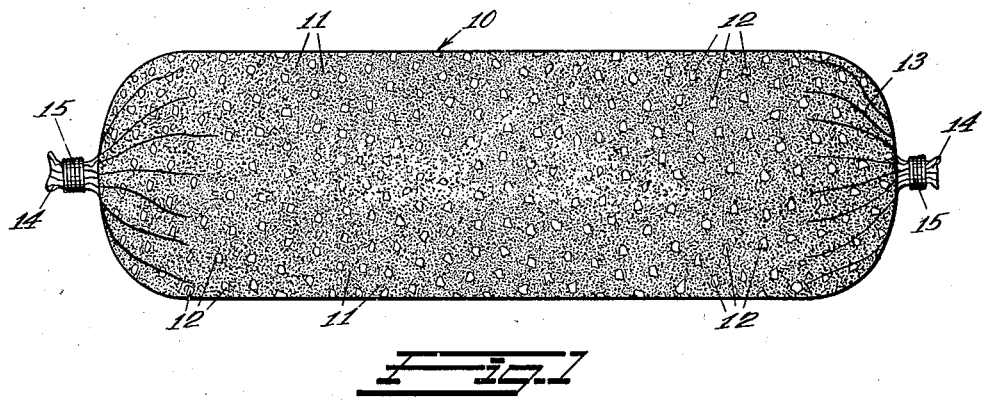
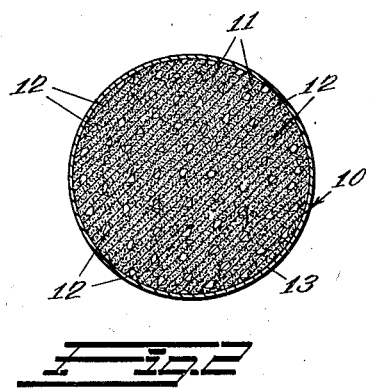
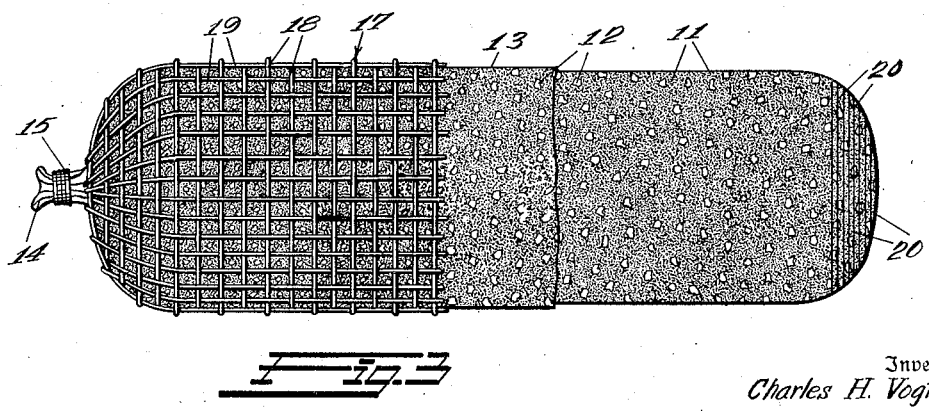
Inventor
Charles H. Vogt
By
Strauch & Hoffman
Attorneys Patented Apr. 14, 1936

2,037,355

UNITED STATES PATENT OFFICE 2,037,355

METHOD OF MAKING A FOOD PRODUCT

Charles H. Vogt, Philadelphia, Pa., assignor to Modern Food Process Company, Philadelphia, Pa., a corporation of Pennsylvania Application February 23, 1932, Serial No. 594,626

3 Claims. (Cl. 99—108)

This invention relates to a novel food product, a novel package including such food product, and a novel mode of making the food product. More particularly, the invention relates to a food product that consists substantially entirely of compacted comminuted meat in which an uncompacted condiment is distributed throughout the meat mixture, and a mode of packaging such product that will accentuate the attractiveness that is given to it by the inclusion of the condiment as just stated.

In compact comminuted meat products, in which it is desired to include a fresh condiment of a vegetable or similar character, it has been found that the identity of the condiment, so far as the flavor thereof and so far as its visibility is concerned, is completely lost in the manufacture of the product, if the condiment is simply added in comminuted form to the meat mixture prior to the molding or compacting of the same into the form desired for the market. I have found that the identity of a fresh vegetable or similar condiment may be maintained in compacted meat products, that the flavor of the product is improved in so doing, and that the appearance of the product is greatly enhanced by proceeding in accordance with the present invention.

I have found further that the attractiveness of a food product including a condiment, having a color that is distinctively different from the color of the meat included in the product, presents an esthetic appeal to prospective purchasers of the product, if it is packaged in such a way as to display the contrast between the condiment and the meat particles to the purchaser through a transparent casing, that serves to preserve the product, and that, at the same time, may be used to display a label or other proper indicia identifying the manufacturer of the article.

I have found further that a comminuted food product encased in relatively fragile transparent material may be subjected to relatively rough handling by encasing the food product in a stockinet bag constructed of such a porous nature that the product is visible through the mesh thereof so that the attractiveness of the package and the food product is not lost by the provision of such a covering as will enable it to be handled expeditiously without destruction of the casing and contamination of the contents thereof.

This invention accordingly aims to provide a food product, including comminuted meat compacted together to form a loaf like structure, in which uncompacted fresh condiment particles are distributed throughout the product so that the particles are distinctly visible as distinct entities from the more dense and heavier meat particles.

Another object of the invention is to provide a method of incorporating fresh condiment in a compacted meat mixture, so that the relatively soft condiment is maintained substantially intact in the form of small pieces thereof distributed throughout the mixture irrespective of any pressure that may be applied to the mixture of which the product is made in order to cause it to assume the form desired by the manufacturer.

Another object of the invention is to provide a method of incorporating a fresh pulpy condiment in a compacted meat mixture including the step of temporarily solidifying the condiment to maintain particles thereof substantially intact during the formation of the food product.

Still another object of the invention is to provide a meat product including a fresh pulpy condiment, such as pimento, distributed throughout the meat mixture in such a way that the identity in appearance and flavor of the pimentos is not merged with the identity of the meat particles and thus virtually lost during the manufacture of the product.

Still another object of the invention is to provide a novel package of a meat product, including plainly visible condiment particles of an appearance contrasting relatively strongly with the appearance of the other ingredients of the product, that protects and preserves the product and, at the same time, displays the appetizing food product to the view of prospective purchasers.

Another object of the invention is to provide a novel mode of protecting a food package encased in a relatively fragile transparent casing of a character that will expose the nature of the product to view, by protecting such casing by means of a loosely woven flexible fabric that will support and sustain the casing when the product is subjected to relatively rough usage without substantially detracting from the appearance of the package by concealing the striking and attractive appearance of the product that is maintained in the desired form by the casing.

Still further objects of the invention will appear as a description thereof proceeds with reference to the accompanying drawing in which:

Figure 1 is a side view of a package of a food product prepared in accordance with the present invention showing one form in which the product may be put upon the market.

Figure 2 is a transverse section of the product appearing in Figure 1.

Figure 3 is a side elevational view, parts of the casing and cover being broken away to illustrate clearly the nature of the attractive form of package of food constituting this invention.

Like reference characters indicate like parts throughout the several figures.

Fundamentally, the food product of the present invention consists essentially of a comminuted meat mixture provided with any desired flavoring or seasoning material incorporated in the meat mixture so that the identity thereof is merged or blended with the comminuted particles, a further fresh uncompacted vegetable condiment distributed throughout the mass of seasoned meat mixture so that the identity of the fresh condiment is maintained in flavor and in appearance, and a casing and/or cover for the food product that not only protects said product from deterioration, but at the same time displays the attractive and appetizing appearance of the product brought about by the maintenance of the fresh condiment in substantially its original condition throughout the mass of the product.

The comminuted meat mixture may be formed of any desired combination, for example, lean cuts of pork, beef or veal or mixtures of the same. The meat may be comminuted in any way and the usual spices or the like may be added and the mixture cured after the addition thereto of salt, saltpeter and/or sugar. This mixture is thoroughly cured following usual or well known practices.

The condiment to be included in the mixture is then prepared separately in such a way that the pieces thereof can be incorporated in the meat mixture without loss of identity. In order that this may be brought about, the condiment which, in the preferred form of the invention, consists in pimentos, peppers or the like, are cut into square, round or irregular pieces approximately one-fourth inch to three-eighths inch in diameter. These pieces, it will be understood, are soft and pulpy in nature, and if it were attempted to add the particles of condiment, in their natural form, to the meat mixture, their mass would be disseminated throughout said mixture and the condiment would be substantially invisible and the flavor thereof distributed throughout the entire product. In order to prevent the loss of such identity, the small pieces of pimento or the like are subjected to a low temperature so that the liquid content thereof freezes. Such freezing may be brought about in any approved manner. The small pieces of condiment in their frozen condition are hard, and may subsequently be combined with the more dense meat particles and the whole subjected to pressure of a degree necessary to mold the food product, without the destruction of the pieces of condiment solidified as just stated.

After the condiment has been prepared in the manner just stated, the particles of condiment in their solid form are distributed substantially evenly throughout the comminuted meat mixture, to which ice may be added following known practices. The temperature of the mixture is thus maintained at a point at which the condiment particles will not dissolve until after formation of the composite roll or loaf.

I have found that a satisfactory proportion of condiment to seasoned meat mixture may be four pounds of pimentos or the like to one hundred pounds of the meat mixture. After the condiment has been thoroughly distributed throughout the meat mixture by any suitable agitating means the product is ready to be molded in units of the desired size and form.

Preferably, the mixture is molded by means of a machine, such as a sausage stuffing machine, by causing the comminuted meat and condiment mixture to flow through a nozzle under pressure into an endless tubular casing similar to a sausage casing. The preferred form of casing is an artificial cellulosic casing that is capable of being handled and treated in all respects like animal sausage casings. A casing of this character is on the market under the trade name "Visking". Suitable means may be provided to support the casing while it is being filled, and, if necessary, when the completed product is put upon the market as hereinafter pointed out. The meat and condiment mixture may be molded in units of the desired size and it is preferred that the same be molded so as to present a unit having the transverse dimension of the order of about five inches and the longitudinal dimension of any desired extent so that the resultant product may be conveniently sliced to produce slices suitable for making sandwiches. The units may be formed of any cross-sectional form that may be preferred, such as the form of the cross-section of a loaf of bread and of the same dimension for the reason just stated.

A product manufactured as just described presents an unusually pleasing appearance when put on display and in addition possesses a very pleasing flavor. I have illustrated in the drawings a unit manufactured as above described, the same consisting of a compacted roll 10. The compacted product includes the plainly visible meat particles 11 that are tightly compacted together. Scattered about the surface of the unit are a multiplicity of plainly visible particles of relatively soft or uncompacted condiment 12. Such particles are plainly visible through the casing 13 which is transparent, and the ends of which are brought together, as indicated at 14, and tied in any suitable manner at 15. The particles of condiments present a pleasing contrast to the compacted meat particles constituting the seasoning of the food product. When pimentos are used as the condiment, the color thereof contrasts nicely with the color of the meat, producing a very appetizing package when viewed through the transparent casing in which the units are preferably encased. Preferably, the casings are provided with suitable indicia (not shown) indicating the trade-name and/or the origin of the product. Such indicia do not conceal the condiment particles scattered throughout the meat mixture, so that none of the attractiveness of the package is lost by the marking thereof with identifying indicia. It will be understood that, as indicated from Figure 2 of the drawing, when the food product is cut the particles of condiments will be just as plainly visible in cross section.

When the food product of the present invention is shipped and subjected to considerable handling, preferably the units are provided with a stockinet cover 17, Figure 3, which may be applied during the operation of stuffing the casing or subsequently as may be desired. The stockinet 17, consists of transverse strands 18 and longitudinal strands 19 very loosely woven so as to present mesh fabric providing relatively large openings between the transverse and longitudinal strands, so that the identifying indicia on the transparent casing, as well as the particles of condiment visible upon the surface of the product may be plainly seen through the encasing cover. Said cover serves to strengthen the cellulosic casing during the filling and handling thereof, so that the unit can be handled without injury or rupture of the encasing membrane.

The completed product is a roll of animal and vegetable content highly desirable for use in the making of sandwiches. When so used the casing and cover 18 are removed and the roll may be sliced by cuts made normal to the longitudinal axis of the roll as indicated at 20 in Figure 3 of the drawing, each slice containing a substantial amount of comminuted meat and a smaller quantity of a fresh vegetable in its natural soft and uncompacted condition. A unitary slice is thus provided that is the correct size and form for the expeditious making of sandwiches of identical quality at every portion thereof.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. The method of incorporating a fresh condiment in a compacted food product, which consists in temporarily solidifying the condiment by freezing, reducing the condiment to pieces of relatively small size distributing the pieces while in solid form throughout the mixture of which the product is composed, and compacting the food product.

2. The method of incorporating a fresh condiment in an uncompacted condition in a compacted comminuted meat product, which consists in temporarily solidifying the condiment by freezing, reducing the solidified condiment to pieces of relatively small size, distributing the pieces throughout the meat mixture and forming the compacted product.

3. The method of making a comminuted meat product including fresh pimento, which consists in freezing the pimento, dividing the frozen pimento into particles of substantial size, mixing said particles in the meat mixture, and compacting the resultant product before the melting of the frozen pimento particles takes place.

CHARLES H. VOGT.